(12) United States Patent
Barrett et al.

(10) Patent No.: US 11,137,413 B2
(45) Date of Patent: Oct. 5, 2021

(54) METHOD OF DETERMINING CONVEYOR OVEN BELT SPEED

(71) Applicants: Todd Kent Barrett, San Diego, CA (US); Larry Fey, Escondido, CA (US); Andrew Daniel Goerzen, Lakeside, CA (US); Miles Moreau, San Diego, CA (US); Ryan Wilshusen, San Diego, CA (US)

(72) Inventors: Todd Kent Barrett, San Diego, CA (US); Larry Fey, Escondido, CA (US); Andrew Daniel Goerzen, Lakeside, CA (US); Miles Moreau, San Diego, CA (US); Ryan Wilshusen, San Diego, CA (US)

(73) Assignee: EMBEDDED DESIGNS, INC

( * ) Notice: Subject to any disclaimer, the term of this patent is extended or adjusted under 35 U.S.C. 154(b) by 0 days.

(21) Appl. No.: 16/185,117

(22) Filed: Nov. 9, 2018

(65) Prior Publication Data

US 2020/0150145 A1    May 14, 2020

(51) Int. Cl.
  *G01P 3/68*  (2006.01)
  *F27B 9/40*  (2006.01)
  *F27D 19/00* (2006.01)

(52) U.S. Cl.
  CPC .................. *G01P 3/68* (2013.01); *F27B 9/40* (2013.01); *F27D 2019/0059* (2013.01)

(58) Field of Classification Search
  CPC ...... G01P 3/38; G01P 3/68; F27B 9/40; F27D 2019/0059; A21B 1/48; A21B 3/02; H05B 6/666; G01N 33/12; G01N 21/65; G01N 21/3563; G01N 2021/3595
  See application file for complete search history.

(56) References Cited

U.S. PATENT DOCUMENTS

| | | | | |
|---|---|---|---|---|
| 5,164,795 A * | 11/1992 | Conway | ................ | B07C 5/3422 250/226 |
| 5,699,161 A * | 12/1997 | Woodworth | ........... | G01B 11/00 356/628 |
| 6,118,132 A * | 9/2000 | Tullis | ..................... | G01B 11/16 250/208.1 |
| 6,713,741 B2 * | 3/2004 | Miller | ...................... | A21B 1/48 219/699 |
| 8,027,516 B2 * | 9/2011 | Kudo | ..................... | H04N 1/506 382/107 |
| 9,857,167 B2 * | 1/2018 | Jovanovski | ............ | G02B 26/10 |
| 9,983,531 B2 * | 5/2018 | Kudo | ................ | G03G 15/5054 |
| 9,989,354 B2 * | 6/2018 | Paske | ..................... | G01B 11/02 |

(Continued)

*Primary Examiner* — Sang H Nguyen

(57) ABSTRACT

A system and method is provided for determining a speed of a belt moving along a transport axis in conveyor oven tunnel. The method includes providing a sensor module, capturing signals, processing the signals, and outputting least one speed estimate. The sensor module is disposed upon the moving belt. The sensor module includes a first optical sensor and a second optical sensor. The optical sensors are spaced apart by a distance D along the transport axis. Capturing signals includes capturing first and second signals from the first and second sensors respectively as they are transported along the belt and within the oven tunnel. Processing the signals includes determining a delay ΔT between the signals. The speed estimate is based upon D divided by ΔT.

20 Claims, 10 Drawing Sheets

(56) References Cited

U.S. PATENT DOCUMENTS

| | | | | |
|---|---|---|---|---|
| 2002/0088800 A1* | 7/2002 | Miller | A21B 1/48 | |
| | | | 219/700 | |
| 2004/0095136 A1* | 5/2004 | Artinger | G01V 3/104 | |
| | | | 324/228 | |
| 2004/0170301 A1* | 9/2004 | Flotats | G01P 3/68 | |
| | | | 382/107 | |
| 2006/0244954 A1* | 11/2006 | Daley | B07C 5/3422 | |
| | | | 356/237.1 | |
| 2009/0134221 A1* | 5/2009 | Zhu | G06K 7/10544 | |
| | | | 235/383 | |
| 2012/0187194 A1* | 7/2012 | Svetal | G07G 1/0045 | |
| | | | 235/470 | |
| 2013/0125648 A1* | 5/2013 | Murashie | G01N 35/1009 | |
| | | | 73/460 | |
| 2014/0044460 A1* | 2/2014 | Kudo | G03G 15/5054 | |
| | | | 399/301 | |
| 2017/0205385 A1* | 7/2017 | Prystupa | G01N 21/65 | |

* cited by examiner

METHOD OF DETERMINING CONVEYOR OVEN BELT SPEED

FIELD OF THE INVENTION

The present disclosure concerns a system for measuring a belt speed in a conveyorized zone oven. In particular, the system is useful for existing ovens that may not have accurate belt speed sensing or control.

BACKGROUND

High temperature zone ovens are in wide use. A typical zone oven has a heated tunnel with a conveyor belt that conveys objects through the tunnel along a transport axis. The oven can define different zones within the tunnel based upon temperature. For each zone of the oven, time and temperature are important parameters for process control. The time spent in a particular zone is dependent upon a conveyor belt speed. Unfortunately this may not be monitored or controlled well enough in some ovens.

SUMMARY

A first aspect of the disclosure is a method of determining a speed of a belt moving along a transport axis in conveyor oven tunnel. The method includes providing a sensor module, capturing signals, processing the signals, and outputting at least one speed estimate. The sensor module is disposed upon the moving belt. The sensor module includes a first optical sensor and a second optical sensor. The optical sensors are spaced apart by a distance D along the transport axis. Capturing signals includes capturing first and second signals from the first and second sensors respectively as they are transported along the belt and within the oven tunnel. Processing the signals includes determining a delay $\Delta T$ between the signals. The speed estimate is based upon D divided by $\Delta T$.

In one implementation, providing the sensor module disposed upon the moving belt includes generally aligning the first and second optical sensors along the transport axis. The belt includes two narrow belts that are spaced apart along a lateral transverse axis that is perpendicular to the transport axis. The sensor module is mounted and affixed to a pallet. Loading the pallet upon the belts requires that a rotational orientation of the pallet relative to a vertical axis is constrained. The constraint generally aligns the optical sensors with the transport axis.

In another implementation, the first and second optical sensors individually include a light emitting device and a detector. The light emitting device emits light generally upwardly toward a ceiling of the tunnel. The detector outputs the signal that is indicative of a power versus time of light captured by the detector.

In yet another implementation, processing includes computing a first time derivative approximation for the first signal and a second time derivative approximation for the second signal. The first and second time derivative approximations can be first and second time varying series representations. Computing the time derivative approximations can include applying a low pass filter to the series representations. The low pass filter attenuates or truncates each series representation based upon frequency.

In a further implementation, processing includes computing a first time based series that represents the first signal and a second time based series that represents the second signal. The delay $\Delta T$ is determined by maximizing a cross-correlation of the first and second series based upon a varying time delay. The series are truncated in time based upon rejection of uncorrelated data to limit the time based series to a time that the sensor module passes through the oven tunnel.

A second aspect of the disclosure is a system for determining a speed of a belt moving along a transport axis in a conveyor oven tunnel. The system includes a sensor module and a host computer. The sensor module is for placement upon the belt and includes a first optical sensor, a second optical sensor, and a processor. The first and second optical sensors are separated by a distance D along the transport axis. The first optical sensor generates a first signal in response to a reflected and received power level from a top surface of the tunnel. The second optical sensor generates a second signal in response to a reflected and received power level from the top surface of the tunnel. The processor receives the first and second signals and then generates information indicative of the first and second signals. The host computer is configured to receive the information indicative of the first and second signals, process the information to determine a delay $\Delta T$ between the signals, and output at least one speed estimate for the belt based upon $D/\Delta T$.

In one implementation, the belt includes two narrow belts that are spaced apart along a lateral transverse axis that is perpendicular to the transport axis. The pallet has a rectangular geometry with a transverse axis that is sized to constrain a rotational orientation of the pallet upon the belts with respect to a vertical axis. The sensor module is affixed to the pallet to generally align the sensors along the transport axis.

In another implementation, processing includes computing a first time derivative series approximation for the first signal and a second time derivative series approximation for the second signal. The computed series are truncated and/or attenuated based on a low pass frequency filter. Processing also includes computing and maximizing a cross-correlation between the two series based upon different time delay displacements. The delay $\Delta T$ is identified based upon the maximized cross-correlation. The time derivative series are temporally truncated based upon data having a correlation greater than a minimum threshold. This truncation limits the series to the time at which the sensor module passes through the oven tunnel.

DETAILED DESCRIPTION OF THE PREFERRED EMBODIMENTS

Figure 1:
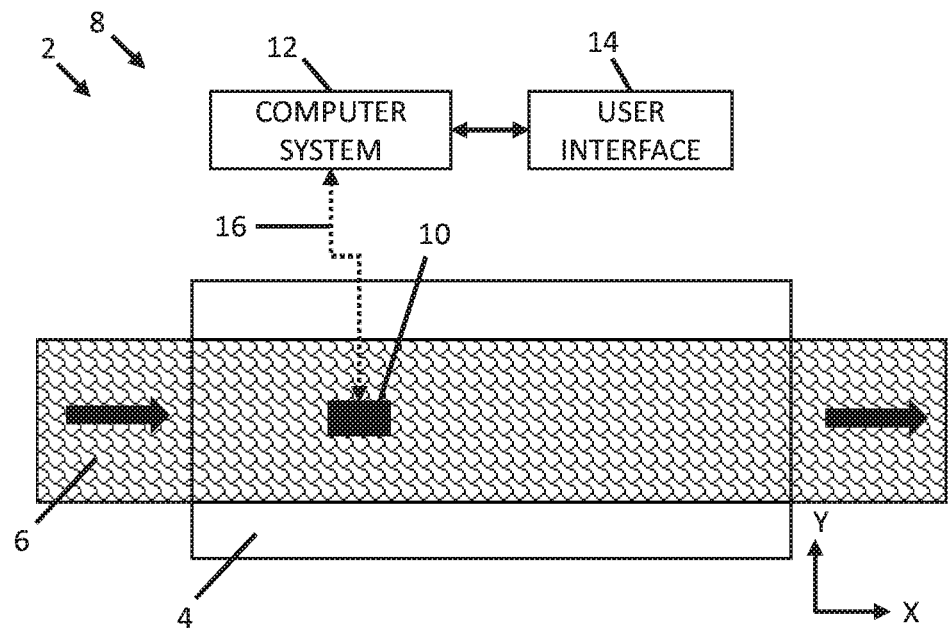
FIG. 1 is a block diagram representation of an embodiment of an oven processing system which includes an oven, a conveyor belt, and a measurement system. The measurement system includes a sensor module and host computer.

FIG. 1 is a schematic block diagram of an oven processing system 2. In describing system 2, mutually perpendicular axes X, Y, and Z can be used. The axes X and Y are lateral axes that are generally horizontal. The axis Z is a vertical axis that is generally aligned with a gravitational reference. By "generally aligned" we mean that these are aligned to within typical mechanical tolerances of manufacturing and locating the oven processing system 2.

Oven processing system 2 includes a zone oven 4 that defines a heated tunnel. The heated tunnel extends along the lateral axis X. A conveyor belt 6 passes through the tunnel and is configured to transport objects along the X-axis which is a transport axis. In an illustrative embodiment, the conveyor belt 6 includes two separate and narrow conveyor belts 6 that are spaced apart along the lateral axis Y which is transverse to the transport axis. In what follows, the terms conveyor 6 and conveyor belt 6 will be used interchangeably for element 6.

Associated with the oven processing system is a measurement system 8 which includes a sensor module 10, a host computer 12, and a user interface 14. Sensor module 10 is configured to generate information that is indicative of an optical sensor signal as the sensor module travels along the conveyor belt 6. The host computer 12 is configured to process the information from sensor module 10 and to output results indicative of a speed of the conveyor belt 6. User interface 14 is coupled to the host computer 12 and can display the outputted results as well as receive inputs from a user. In some embodiments, the user interface 14 can be integrated into the host computer 12. Host computer 12 can include one or more of a desktop computer, a laptop computer, a tablet computer, and a smartphone to name a few examples. The host computer 12 is configured to be electrically coupled or linked to the sensor module 10 using a link 16. Link 16 can be mechanical (e.g., an electrical conductor) or wireless.

Figure 2:
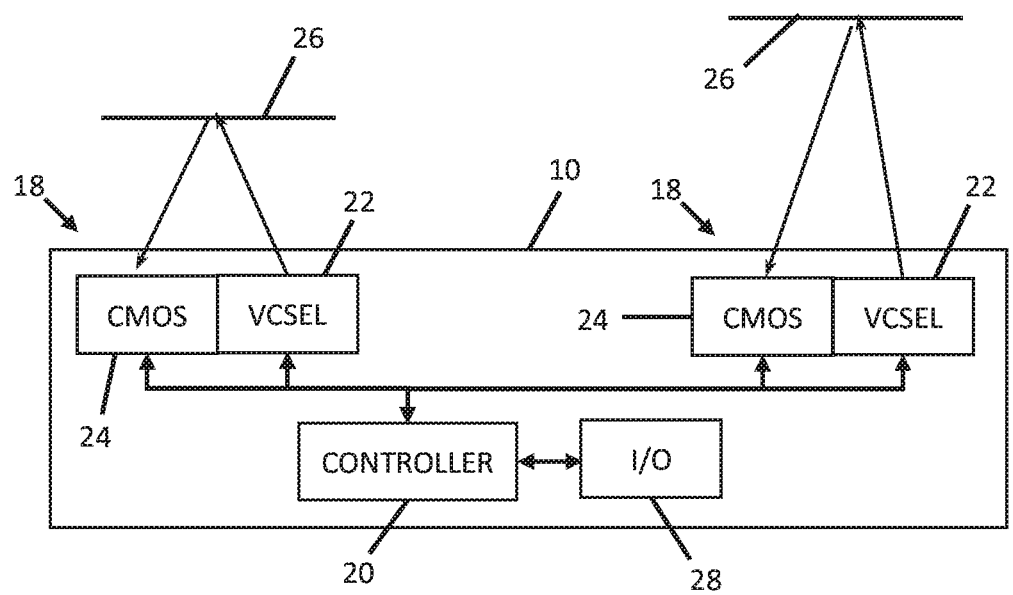
FIG. 2 is a schematic block diagram of an embodiment of a sensor module having two sensors coupled to a controller. In the illustrative embodiment, the sensors individually include a VCSEL (vertical cavity surface emitting laser) and a CMOS (complementary metal oxide semiconductor) sensor.

FIG. 2 is a schematic block diagram of a sensor module 10. Sensor module 10 includes two sensors 18 coupled to a controller 20. The sensors 18 individually include an emitter 22 and detector 24. Emitter 22 is an optical emitter such as a semiconductor laser or a light emitting diode (LED). In the illustrative embodiment, the emitter 22 is a vertical cavity surface emitting laser (VCSEL) 22.

In the illustrative embodiment, the detector 24 is a complementary metal oxide semiconductor (CMOS) device. In an alternative embodiment, detector 24 can be a charge coupled device (CCD).

In use, the emitter 22 transmits light generally upwardly in a +Z direction. The transmitted light impinges upon an upper bound 26 or ceiling surface 26 of the tunnel within the oven 4. Light is reflected downwardly to the detector 24 which emits a signal that temporally varies according to a received power of the received reflected light. The power varies according to a height, geometry, and reflectivity of the ceiling 26 of the oven 4 tunnel. The controller 20 stores the signals from sensors 18 and routes information to the host computer 12 via an input/output (I/O) device 28.

Figure 3:
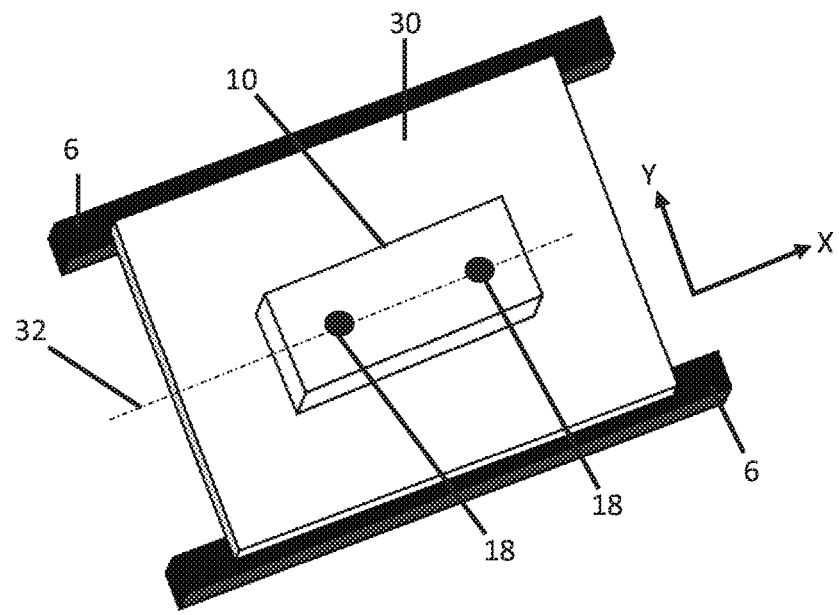
FIG. 3 is an isometric view of an embodiment of a sensor module mounted on or affixed to a pallet that is being transported by a conveyor belt along a transport axis X. The conveyor belt includes two belts that are spaced apart relative to a transport axis Y. The sensor module includes two sensors. A geometry of the pallet relative to the pair of belts constrains an orientation of the sensor module so as to align the sensors along the axis X.

FIG. 3 is a simplified schematic isometric illustration of the sensor module 10 loaded or affixed onto the conveyor 6. In the illustrative embodiment, the conveyor 6 is two narrow conveyor belts 6 that are separated along a transverse axis Y. The sensor module 10 can be fixedly mounted to a pallet 30. The pallet 30 can be designed with a geometry whereby it is essentially impossible to mount the sensor onto conveyor 6 without arranging the two sensors 18 to be aligned along the transport axis X. An axis 32 which passes through the two sensors 18 will then be generally aligned with the transport axis X. By "generally aligned" it is implied that the alignment is by design to within tolerances such as plus or minus five degrees.

Figure 4:
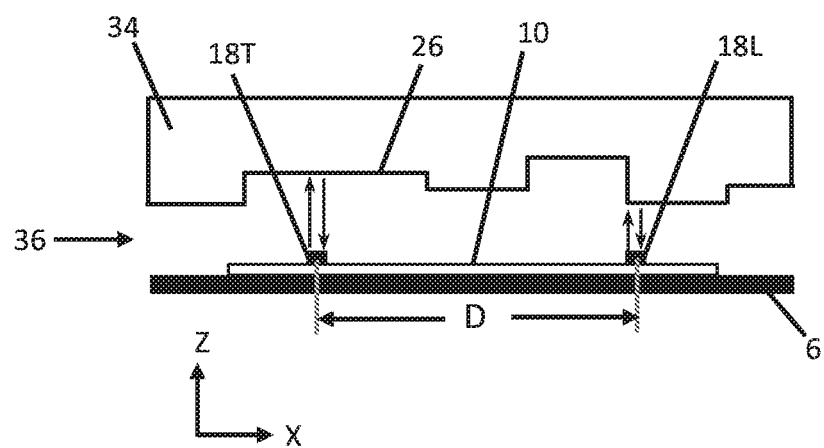
FIG. 4 is a side view of an embodiment of a sensor module being transported along a transport axis through the tunnel of an oven. The sensor module has two sensors that are spaced a distance D apart with respect to the transport axis.

FIG. 4 is a side cross-sectional illustration including the conveyor 6, sensor module 10, and a top portion 34 of the oven 4. Defined between the ceiling 26 of the top portion 34 and the conveyor 6 is the heated oven tunnel 36.

There is a distance D between the two sensors 18 along the transport axis X. The sensors 18 emit and receive light along vertical axis Z. As indicated, the ceiling 26 surface from which light emitted from sensors 18 is reflected varies in height along vertical axis Z. Also, the ceiling 26 exhibits a variable geometry and reflectivity which is not illustrated but understood. The variable height, geometry, and reflectivity will all affect a power level of reflected light received by the sensors 18. The sensors will, in turn, output power level P(t) signals that vary with time.

Figure 5:
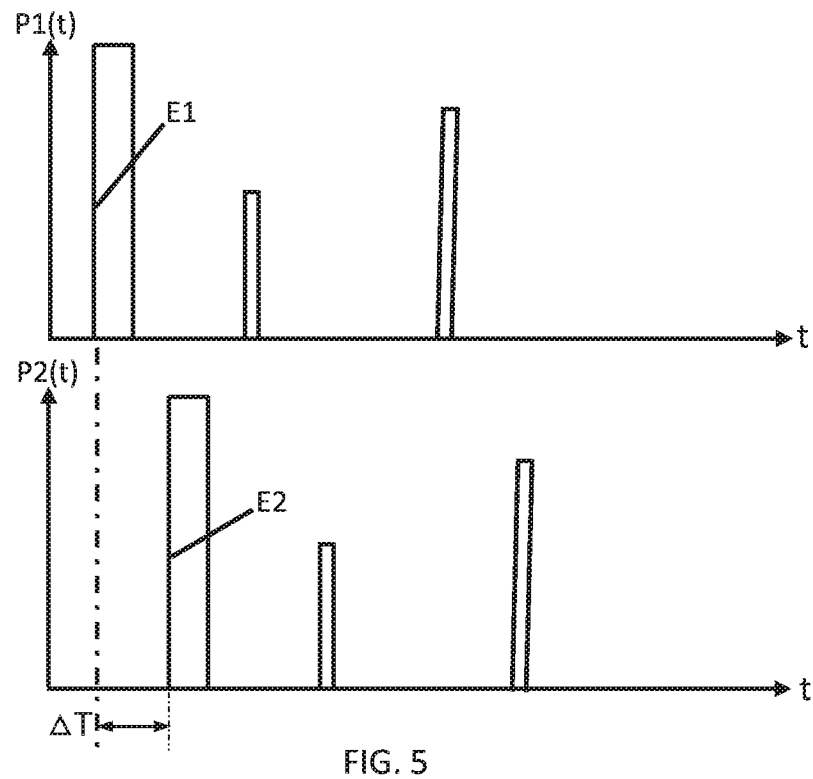
FIG. 5 is a timing diagram depicting an idealized signal output from the two sensors of the sensor module with the top portion of the diagram being the signal from the lead sensor. A time shift or delay ΔT between the two signals is depicted.

FIG. 5 depicts idealized power signals P1(t) and P2(t) from sensors 18 that are generated as the module 10 passes through the tunnel 36. The signal P1(t) is from the lead sensor 18L (larger value of X versus time) compared to the trailing sensor 18T. The vertical axis represents received power and the horizontal axis represents time. The two signals are, as expected, generally identical, except that they are shifted in time by a time shift ΔT. By comparing the two signals ΔT can be determined. Computing distance D divided by time shift ΔT provides an estimate for the speed of the conveyor 6 along the transport axis X.

The time shift ΔT can be determined a number of ways. One way is to identify a feature such as an edge of a big change in power such as the depicted edge E1 from signal P1 and the same edge E2 from signal P2. The time difference of occurrence of these edges is ΔT.

Figure 6:
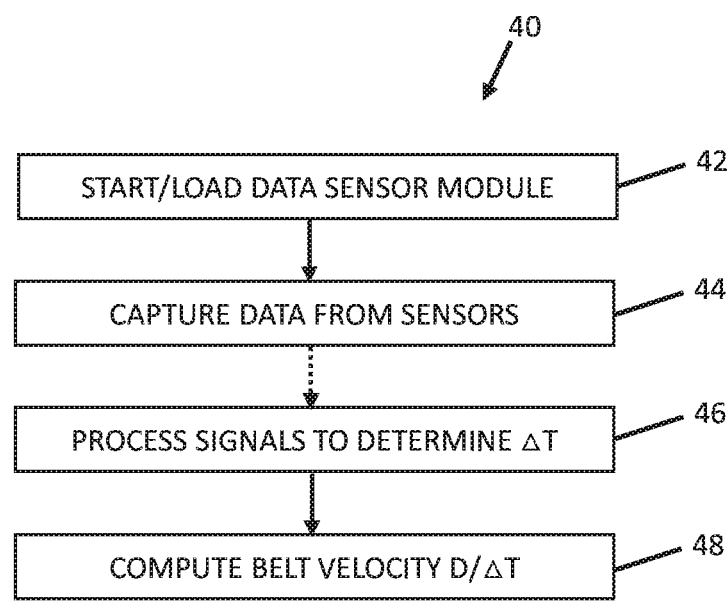
FIG. 6 is a high level operational flowchart of an embodiment of a method by which the measurement system determines belt speed.

FIG. 6 is a flowchart depicting an embodiment of a method 40 of determining a conveyor speed V given using the measurement system 8. Steps 42 and 44 are performed by the sensor module 10 and the steps 46 and 48 are performed by the host computer 12. Between steps 44 and 46 is a dashed arrow which depicts a time at which a communication is established between the sensor module 10 and the host computer 12.

According to 42, the sensor module 10 is activated and loaded upon the conveyor 6. According to 44, the sensors 18 are emitting and receiving light and generating signals indicative of a received power level versus time. Also according to 44, the sensor module 10 controller 20 is storing information indicative of the two sensor 18 signals. The information is indicative of a power level versus time for each of sensors 18L and 18T.

According to 46, the host computer 12 processes information from the sensor module 10 indicative of the power level versus time signals from the sensors 18 in order to determine ΔT. According to 48, the host computer 12 computes and communicates a computed belt speed V equal to D/ΔT.

As part of steps 42-46, the signal information from sensors 18 is transferred from the sensor module 10 to the host computer 12. In an illustrative embodiment, the sensor module 10 has an electrical interconnect that is electrically coupled to the host computer 12 as part of step 46. In other embodiments, the sensor module 10 can have a wireless link to host computer 12 that can even begin during step 44.

Figure 7:
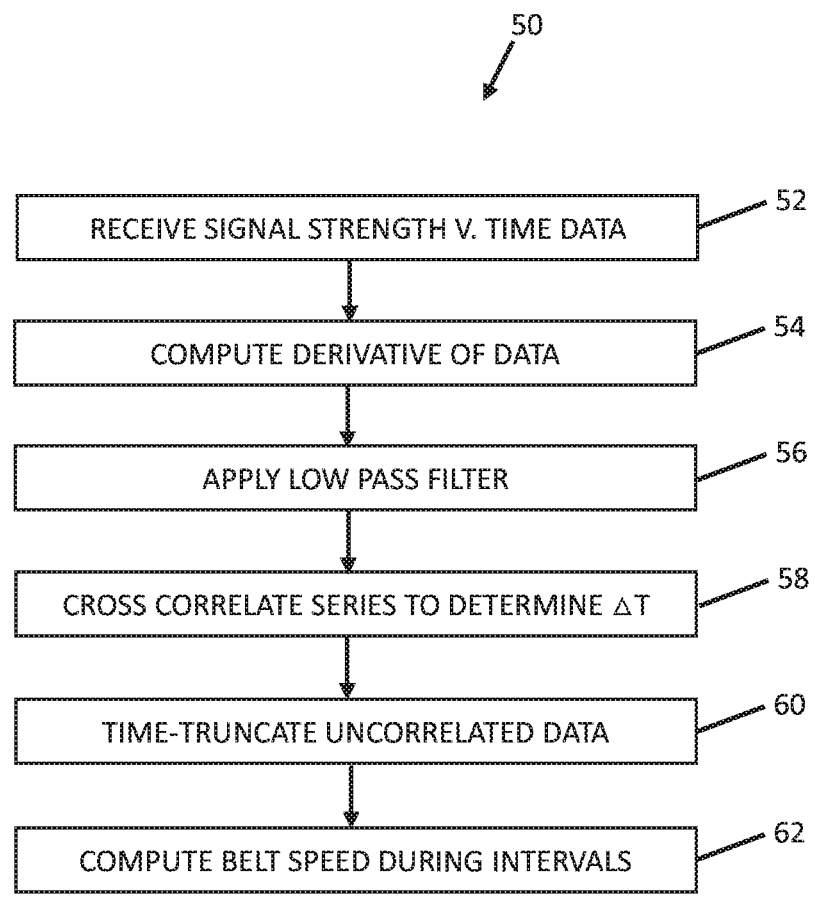
FIG. 7 is a flowchart of an embodiment of a method of processing data from the sensor module to determine the belt speed. The method is performed by a host computer.
Figure 8:
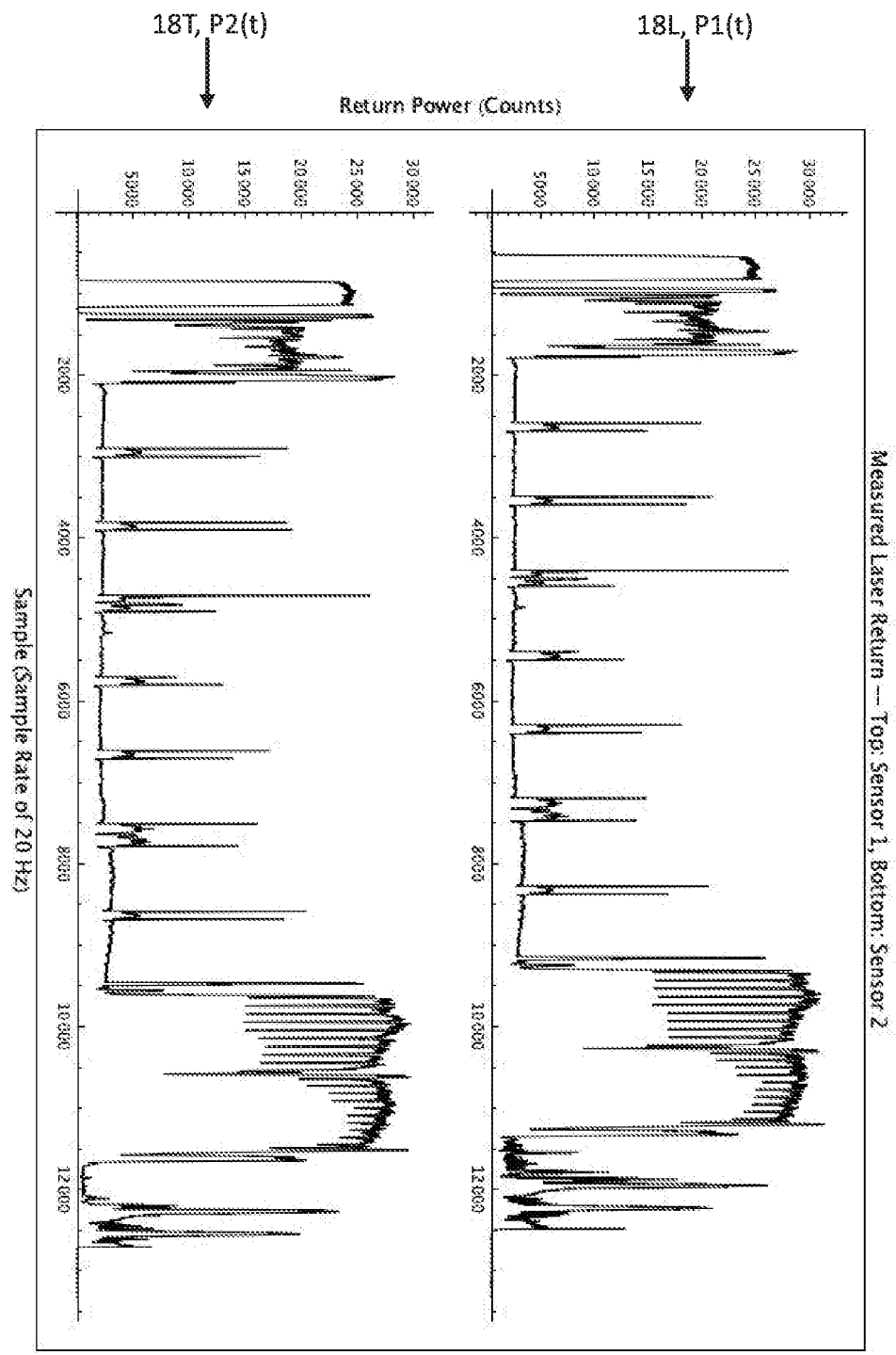
FIG. 8 is a graphical representation of power versus time received from two sensors. P1($t$) represents power versus time received from a leading sensor. P2($t$) represents power versus time received from a trailing sensor.
Figure 9:
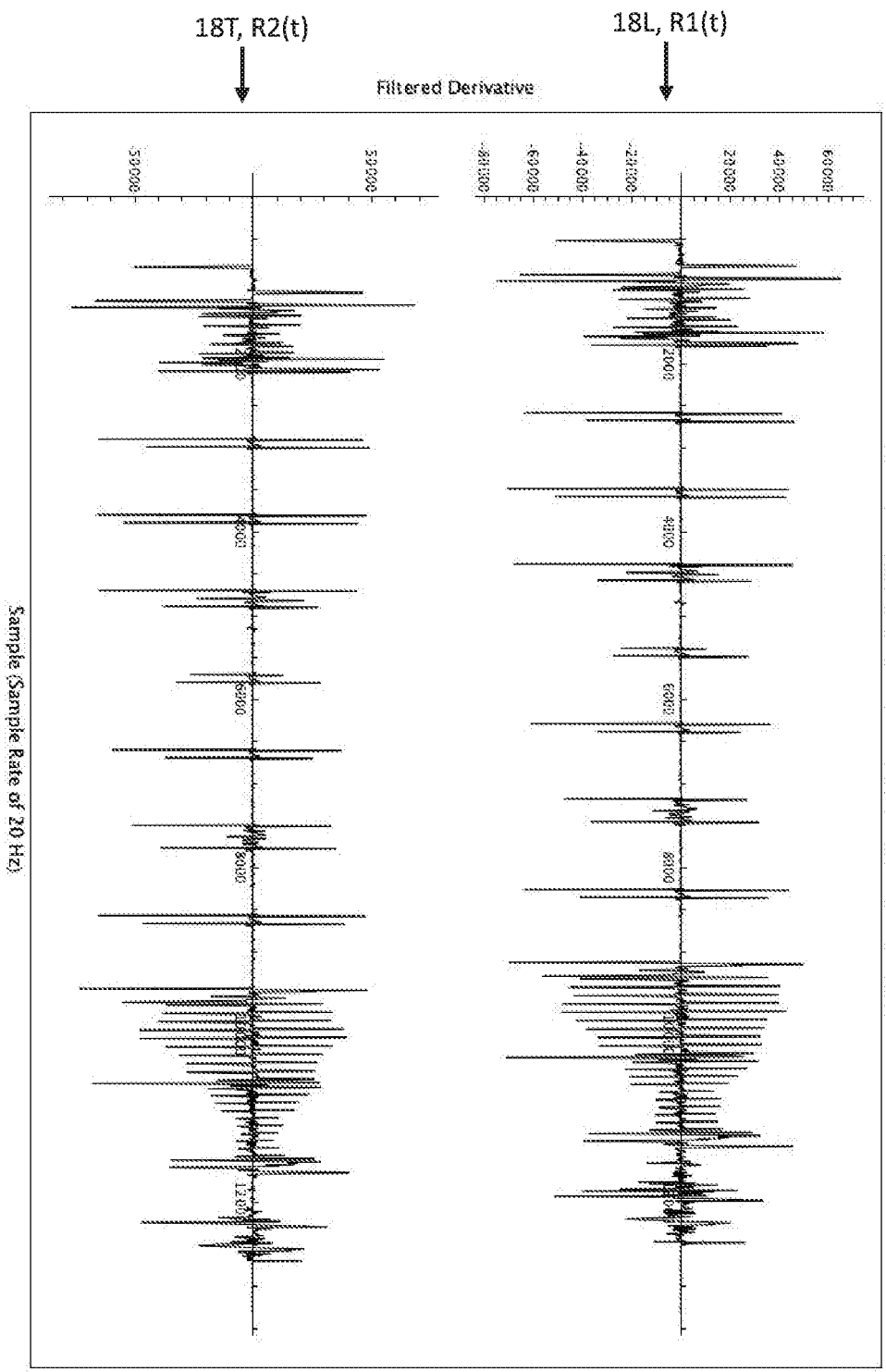
FIG. 9 is a graphical representation of a filtered derivative of power versus time P(t) for the power curves of FIG. 8. The power versus time signal P1($t$) was convolved to generate a time varying series R1($t$). Generation of the series included applying a low pass filter to attenuate and/or truncate high frequency terms of the series. In the same way, P2($t$) was convolved to generate a time varying series R2($t$).
Figure 10:
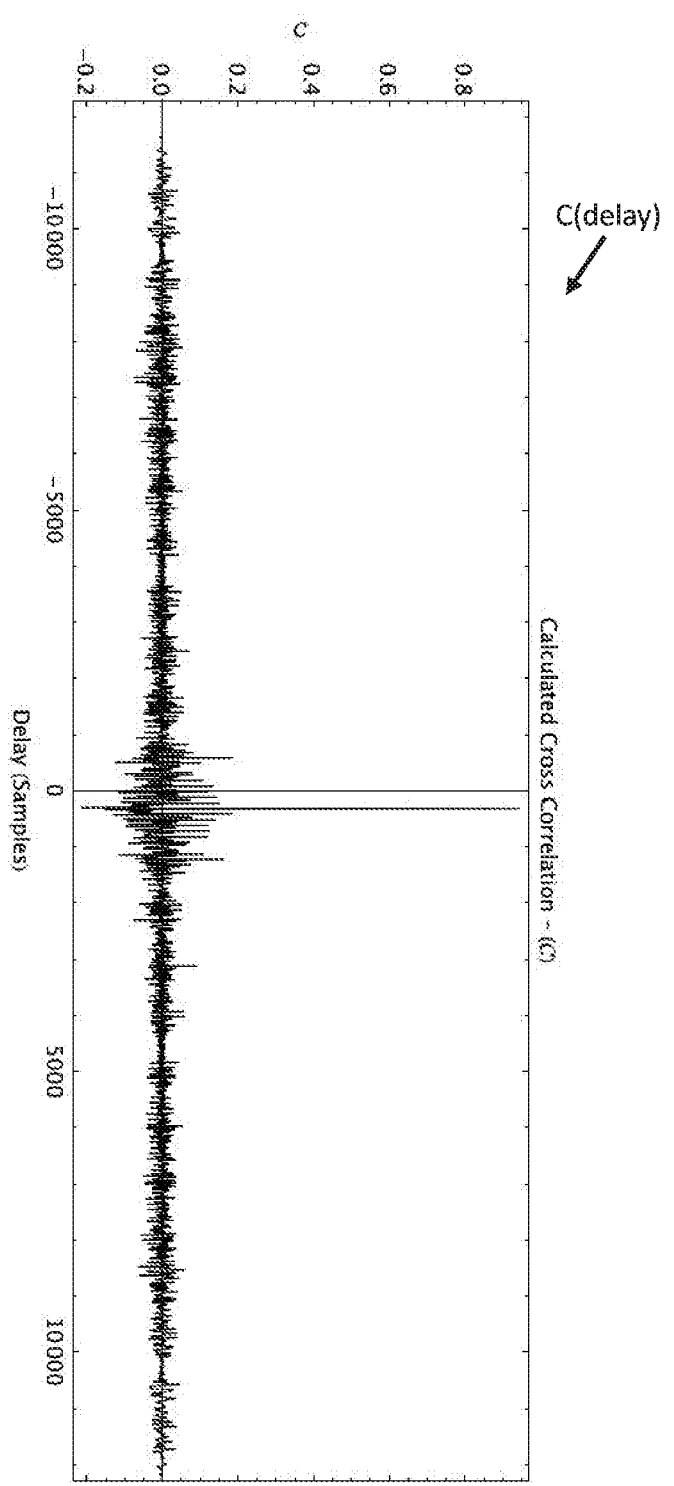
FIG. 10 is a cross-correlation versus a time delay or shift for the R(t) data of FIG. 9. The cross-correlation is taken by time-shifting, multiplying, and summing the two series representing R1 and R2.

FIG. 7 is a flowchart depicting an embodiment of a method 50 of processing information received from the sensor module 10. Method 50 generally corresponds to steps 46 and 48 of FIG. 6 but provide greater detail of the illustrative embodiment. FIGS. 8-10 exemplify method 50 and will be referred to as the method steps are described.

According to 52, the power level versus time data is inputted and received. This data is illustrated in FIG. 8 for the lead sensor 18L and the trailing sensor 18T. The graphs illustrate return power P(t) versus time received by the sensors 18T and 18L. As expected the signals look very similar and any variance between them would be a difference between the two sensors 18.

Figure 8A:
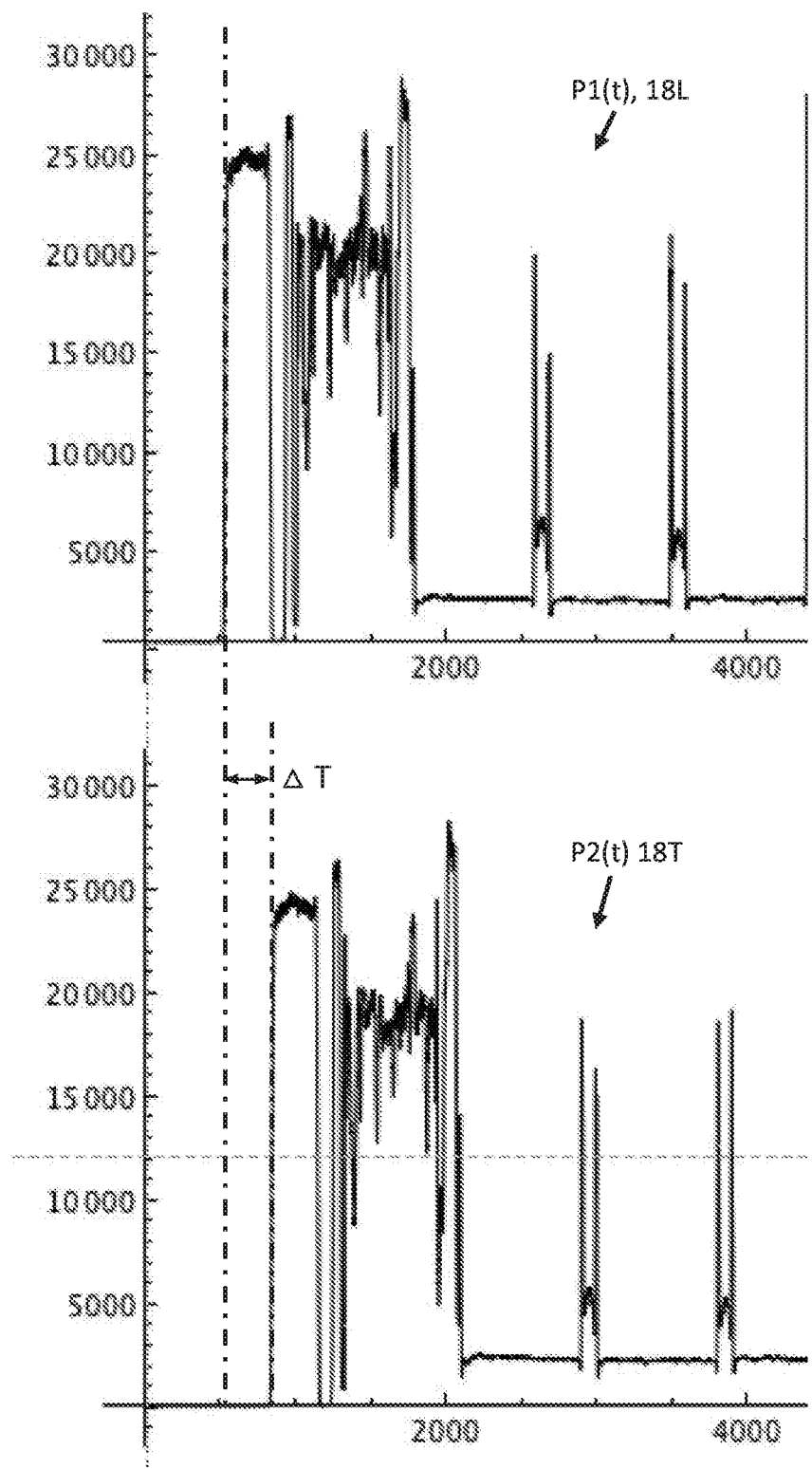
FIG. 8A is graphical detail taken from a portion of FIG. 8. Illustrated is a time shift ΔT that can be determined by comparing similar waveforms for the two power P(t) signals.

FIG. 8A depicts a portion of FIG. 8 in greater detail. A temporal (time) shift ΔT can be identified by comparing similar-shaped peaks. In FIG. 8A, P1(t) is the illustrated power level versus time for the lead sensor 18L. P2(t) is the illustrated power level versus time for the trailing sensor 18T.

According 54, an approximation of a derivative R(t) of the signal P(t) from step 52 is computed for each sensor 18. According to step 56, a low pass filter is applied to the derivatives. Steps 54 and 56 can be applied by determining a truncated time-varying series that represents R(t). This includes convolving a time series P(t) with a truncated version of a derivative of a Gaussian representation. The result is a time-varying series R1(t) for the leading sensor 18L and a time-varying series R2(t) for the trailing sensor 18T.

Figure 9A:
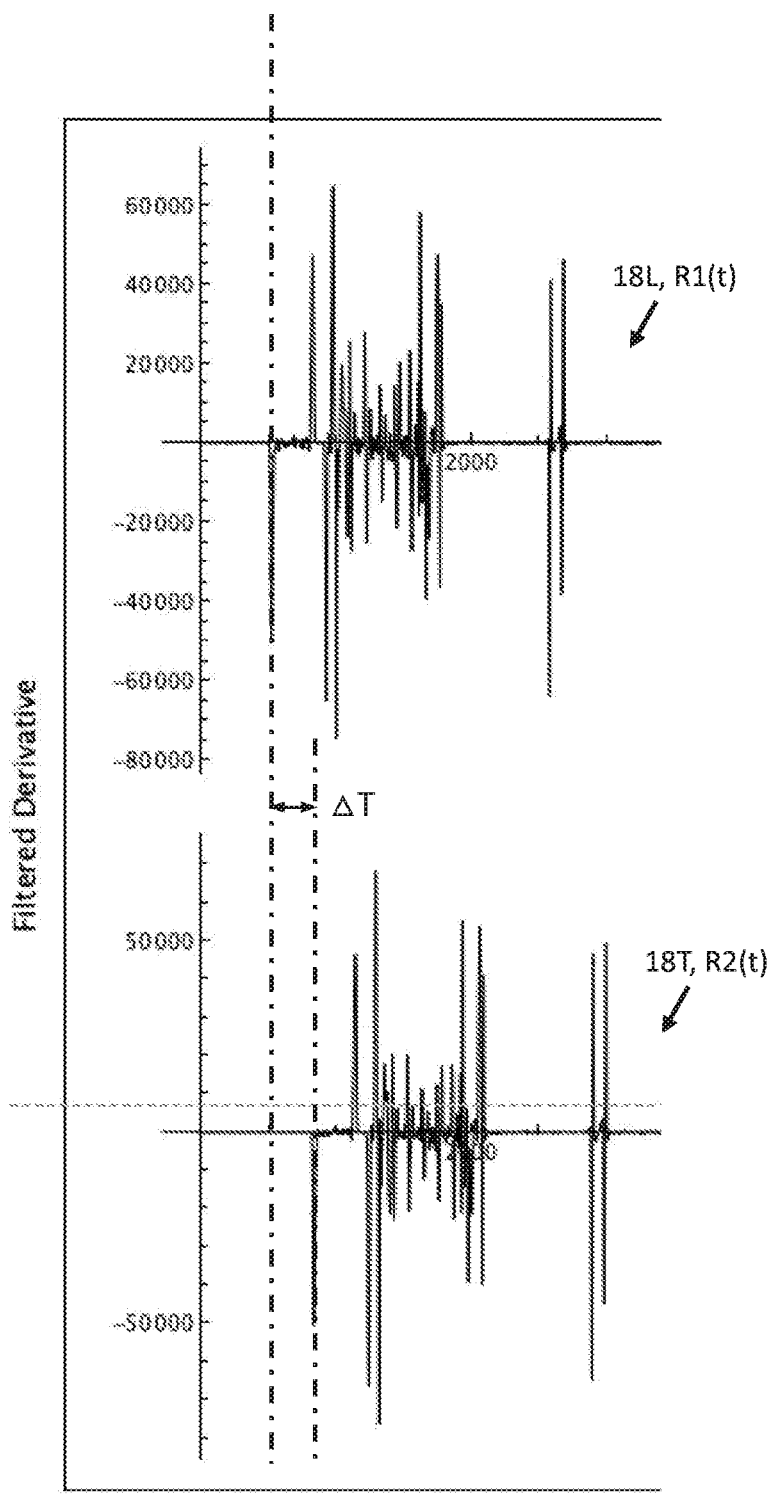
FIG. 9A is graphical detail taken from a portion of FIG. 9. Illustrated is a time shift ΔT that can be determined by comparing similar waveforms for the two power R(t) graphs. Using the derivative for this purpose allows for a more accurate determination of similar points on the two curves R1 and R2.

FIG. 9 depicts the results of steps 56 and 56. R1(t) and R2(t) are generated from series representations of the filtered derivative function for the sensors 18L and 18T respectively. Using the processed derivative signals R(t) rather than power level P(t) can provide a more accurate determination of an identified change. FIG. 9A depicts a portion of FIG. 9 in greater detail.

According to 58, the series R1(t) and R2(t) are cross-correlated. This is done by multiplying element by element for different time shifts of the series and taking the series of the multiplied terms. The cross-correlation series will exhibit a peak when the individual peaks of the series line up temporally. Because the individual peaks of R(t) are very sharp, this will result in a peak value that is much higher than those for other time shifts.

Figure 10A:
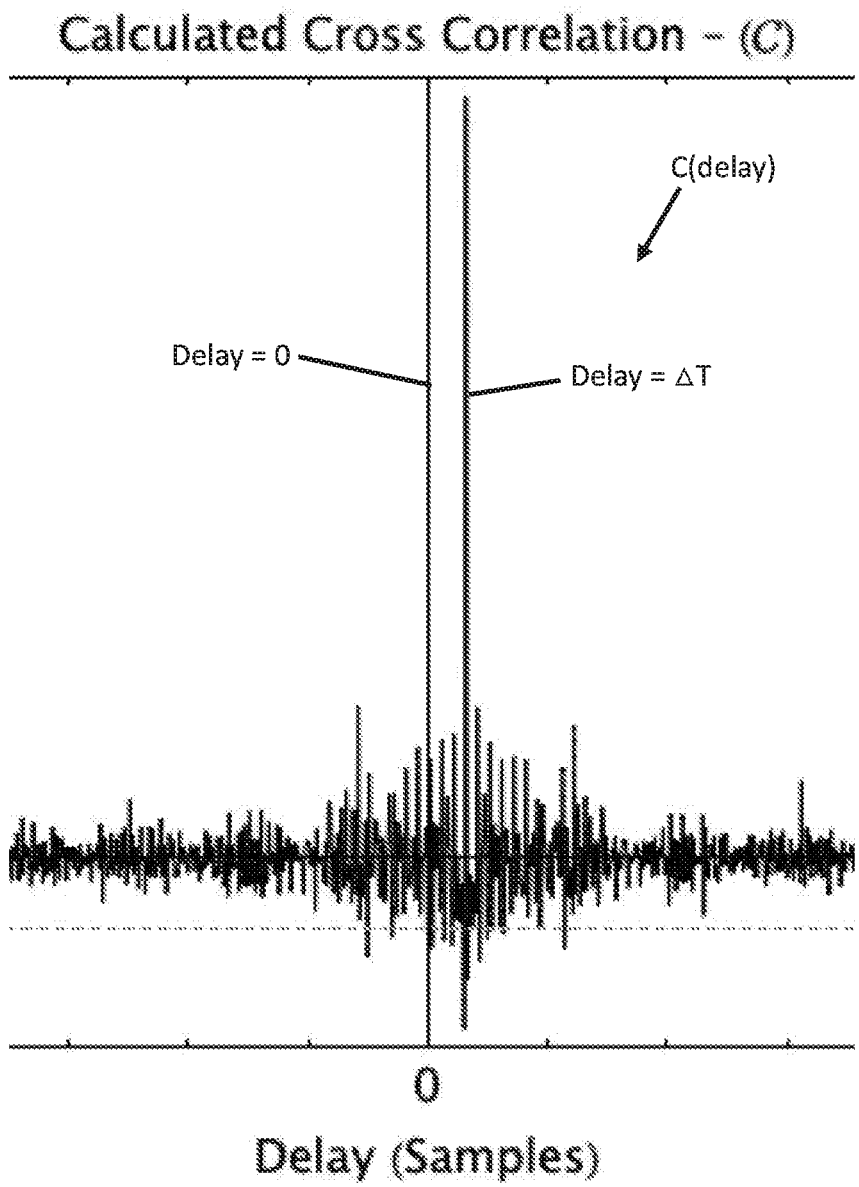
FIG. 10A is graphical detail taken from FIG. 10. As illustrated, the cross correlation C(delay) has a very high peak maximum when the delay equals ΔT. The average speed of the conveyor can then be accurately estimated by computing D/ΔT in which D is a distance along the transport direction between the two sensors.

The cross correlation versus time shift or delay is illustrated in FIG. 10. The delay has been introduced in the first time varying series R1(t). A detailed view of a portion of FIG. 10 is depicted in FIG. 10A. A central line depicting delay equals zero is indicated. As indicated, the cross correlation C(delay) exhibits a very large peak at delay=ΔT.

According to step 60, the plots R(t) are temporally truncated based upon the correlation versus time or C(t) versus time. C(t) is computed and exhibits a large decrease for the time spent outside of the oven tunnel 36 because the data from outside the oven is random and uncontrolled because there is no close and fixed surface from which light from sensors 18 can be reflected.

According to step 62, the speed of the conveyor 6 is computed for various individual time intervals. This can be done by computing and maximizing C(delay) for the individual time intervals if this is desired. The speed computation will be equal to D/ΔT for the selected interval(s).

The specific embodiments and applications thereof described above are for illustrative purposes only and do not preclude modifications and variations encompassed by the scope of the following claims.

For example, alternative ways of measuring the speed are possible. As one alternative, a pattern recognition algorithm can be applied to the power versus time P(t) curves for the leading 18L and trailing 18L sensors. As another alternative, a pattern recognition algorithm can be applied to the derivative signal estimate R(t) curves for the leading 18L and trailing 18L sensors.

What is claimed:

1. A method for determining a speed of a belt moving along a transport axis in a conveyor oven tunnel, the method comprising:
   providing a sensor device disposed upon the moving belt, wherein the sensor device includes a first optical sensor and a second optical sensor, and wherein the optical sensors are spaced apart by a distance D along the transport axis;
   capturing first and second signals from the first and second sensors, respectively, as they are transported along the moving belt and within the oven tunnel;

processing the first and second signals to determine a delay ΔT between the signals; and outputting at least one speed estimate for the belt based upon D/ΔT.

2. The method of claim 1, wherein providing the sensor device disposed upon the moving belt includes generally aligning the first and second optical sensors along the transport axis.

3. The method of claim 2, wherein the belt includes two narrow belts that are spaced apart along a lateral transverse axis that is perpendicular to the transport axis, and wherein the sensor device is mounted to a pallet that constrains the orientation relative to the transport axis to align the sensors.

4. The method of claim 1, wherein the first and second optical sensors individually include a light emitting device and a detector, wherein the light emitting device is configured for emitting light upwardly toward a ceiling of the tunnel, and wherein the detector is configured for outputting the signal that is indicative of a power versus time of light captured by the detector.

5. The method of claim 1, wherein the processing includes computing a first time derivative approximation for the first signal and a second time derivative approximation for the second signal.

6. The method of claim 5, wherein the computing of the derivative approximations includes applying a low pass filter to the computed time derivative approximations.

7. The method of claim 5, wherein the first time derivative approximation is a first time derivative series representation, and the second time derivative approximation is a second time derivative series representation.

8. The method of claim 7, wherein the processing includes maximizing a cross-correlation between the first and second time derivative series approximations to determine ΔT.

9. The method of claim 7, wherein the processing includes temporally truncating the time derivative series to remove uncorrelated data corresponding to times before and after the sensor device passes through the tunnel of the oven.

10. A conveyor oven system comprising:
a heated tunnel:
a moving conveyor belt which is moving along a transport axis that passes through the heated tunnel;
a sensor device disposed upon the moving conveyor belt, the sensor device including:
a first optical sensor that generates a first signal in response to a reflected power level from a top surface of the tunnel;
a second optical sensor that generates a second signal in response to a reflected power level from the top surface of the tunnel, wherein the first and second optical sensors are separated by a distance D along the transport axis; and
a processor that receives the first and second signals and then generates information indicative of the first and second signals; and
a host computer configured to:
receive the information indicative of the first and second signals;
process the information to determine a delay ΔT between the signals; and
output at least one speed estimate for the belt based upon D/ΔT.

11. The system of claim 10, wherein the sensor device is mounted to a pallet that geometrically constrains placement upon the belt whereby the first and second optical sensors are generally aligned with the transport axis.

12. The system of claim 10, wherein the first and second optical sensors individually include a light emitting device and a detector, wherein the light emitting device is configured to emit light upwardly toward a ceiling of the tunnel, and wherein the detector is configured to output the signal which is indicative of a power of light reflected from the ceiling and received by the detector.

13. The system of claim 12, wherein the light emitting device is one or more of a semiconductor laser and a light emitting diode.

14. The system of claim 13, wherein the light emitting device is a vertical cavity surface emitting laser (VCSEL).

15. The system of claim 12, wherein the detector is a complementary metal oxide semiconductor (CMOS) device.

16. The system of claim 12, wherein the processing of the information includes computing a first time derivative series approximation for the first signal and a second time derivative series approximation for the second signal.

17. The system of claim 16, wherein the computing of each of the time derivatives series includes applying a low pass filter to each series.

18. The system of claim 16, wherein the processing of the information includes computing a cross-correlation between the first and second time derivative series based upon different time delays of the first time derivative series and determining ΔT as the delay that maximizes the cross-correlation.

19. The system of claim 18, wherein the processing of the information includes temporally limiting the series to correlated data above a certain threshold.

20. The system of claim 10, wherein the at least one speed estimate includes speed estimates for designated lateral intervals within the tunnel.

\* \* \* \* \*